US009725168B2

(12) United States Patent
Kim

(10) Patent No.: US 9,725,168 B2
(45) Date of Patent: Aug. 8, 2017

(54) UNMANNED AERIAL VEHICLE WITH ROTATABLE GRIPPER

(71) Applicant: Yong Kuk Kim, Seoul (KR)

(72) Inventor: Yong Kuk Kim, Seoul (KR)

(*) Notice: Subject to any disclaimer, the term of this patent is extended or adjusted under 35 U.S.C. 154(b) by 0 days.

(21) Appl. No.: 15/096,559

(22) Filed: Apr. 12, 2016

(65) Prior Publication Data

US 2017/0029104 A1    Feb. 2, 2017

(30) Foreign Application Priority Data

Jul. 31, 2015    (KR) .................. 20-2015-0005148 U

(51) Int. Cl.
*B64C 39/02*    (2006.01)
*B64C 27/08*    (2006.01)
*B64D 1/22*    (2006.01)

(52) U.S. Cl.
CPC .............. *B64C 39/02* (2013.01); *B64C 27/08* (2013.01); *B64D 1/22* (2013.01); *B64C 2201/027* (2013.01); *B64C 2201/042* (2013.01); *B64C 2201/128* (2013.01)

(58) Field of Classification Search
CPC .............. B64C 39/02; B64C 2201/027; B64C 2201/042; B64C 2201/128; B64D 1/22; B64D 25/00; B64D 25/02; B25J 15/0253; B25J 15/106
See application file for complete search history.

(56) References Cited

U.S. PATENT DOCUMENTS

| 9,387,928 | B1* | 7/2016 | Gentry .................. B64C 39/024 |
| 2006/0113425 | A1 | 6/2006 | Rader | |
| 2012/0226394 | A1 | 9/2012 | Marcus | |
| 2016/0144954 | A1* | 5/2016 | Daigle .................. B64C 39/024 |
| | | | | 244/17.23 |

FOREIGN PATENT DOCUMENTS

| KR | 10-1042200 | 6/2011 |
| KR | 10-1286376 | 7/2013 |

OTHER PUBLICATIONS

English Translation of 10-1042200.
English Translation of 10-1286376.

* cited by examiner

*Primary Examiner* — Timothy D Collins
*Assistant Examiner* — Jessica Wong
(74) *Attorney, Agent, or Firm* — KORUS Patent, LLC; Seong Il Jeong

(57) ABSTRACT

According to an embodiment of the present invention, an unmanned aerial vehicle comprises a body, a plurality of arms provided on a periphery of the body, a propeller provided on each of the plurality of arms and driven by a driving motor, and a gripper provided on a bottom of the body to grip an object. The gripper may include a supporting bar extending downward from the bottom of the body and a head provided at a lower end of the supporting bar to grip the object.

3 Claims, 5 Drawing Sheets

UNMANNED AERIAL VEHICLE WITH ROTATABLE GRIPPER

CROSS-REFERENCE TO RELATED APPLICATIONS

This patent application claims priority under 35 U.S.C. §119 to Korean Utility Model Application No. 20-2015-0005148, filed on Jul. 31, 2015, in the Korean Intellectual Property Office, the disclosure of which is incorporated by reference herein in its entirety.

TECHNICAL FIELD

Embodiments of the present invention concern unmanned aerial vehicles, and more specifically, an unmanned aerial vehicle with a structure enabling the transportation of products or objects at a stable position.

DISCUSSION OF RELATED ART

An unmanned aerial vehicle (UAV), commonly known as a drone, is an aircraft without a human pilot aboard. The flight of UAVs may be controlled with various kinds of autonomy: either by a given degree of remote control from an operator, located on the ground or in another vehicle, or fully autonomously, by onboard computers. Various types of UAVs have been developed for a diversity of purposes, such as hobby and recreational use, aerial surveillance, or motion picture filmmaking. There is an attempt to use UAVs to carry goods or products from one place to another. However, an issue is that the worker himself needs to mount an object on the flying device, and this is quite bothering in using the device for such transportation purpose.

SUMMARY

According to embodiments of the present invention, there are unmanned aerial vehicles that may carry various types of objects without involvement of the worker.

According to an embodiment of the present invention, an unmanned aerial vehicle comprises a body, a plurality of arms provided on a periphery of the body, a propeller provided on each of the plurality of arms and driven by a driving motor, and a gripper provided on a bottom of the body to grip an object. The gripper may include a supporting bar extending downward from the bottom of the body and a head provided at a lower end of the supporting bar to grip the object. The head may include a support, a pair of gripping members being slidable in a direction along which the gripping members come closer together, a rotating member rotatably coupled with the support and rotated clockwise or counterclockwise by an additional driving motor, and connecting rods connecting the rotating member with the gripping members. The gripping members may press against a periphery surface of the object to hold or fasten the object.

A landing device may be provided on the bottom of the body. The supporting bar may be configured to allow the head to be positioned at a lower side of the landing device. A rotating bracket may be coupled to the bottom of the body so that an upper end of the supporting bar can rotate. An ascending/descending means may be connected with the supporting bar to pivotally ascend or descend the gripper.

The unmanned aerial vehicle may further comprise a horizontality sensor provided in the body, a position adjustor provided in the body to adjust a position of the gripper in a front, rear, left, or right direction of the gripper, and a controller receiving a signal from the horizontality sensor to control the position adjustor to adjust the position of the gripper in the front, rear, left, or right direction of the gripper.

When a center of gravity of the object gripped by the gripper is inconsistent with a center of gravity of the body, the controller may adjust the position of the gripper in the front, rear, left, or right direction of the gripper using the position adjustor so that the center of gravity of the object is consistent with the center of gravity of the body.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the inventive concept will be described in detail with reference to the accompanying drawings. The inventive concept, however, may be modified in various different ways, and should not be construed as limited to the embodiments set forth herein. As used herein, the singular forms "a," "an," and "the" are intended to include the plural forms as well, unless the context clearly indicates otherwise. It will be understood that when an element or layer is referred to as being "on," "connected to," "coupled to," or "adjacent to" another element or layer, it can be directly on, connected, coupled, or adjacent to the other element or layer, or intervening elements or layers may be present.

Figure 1:
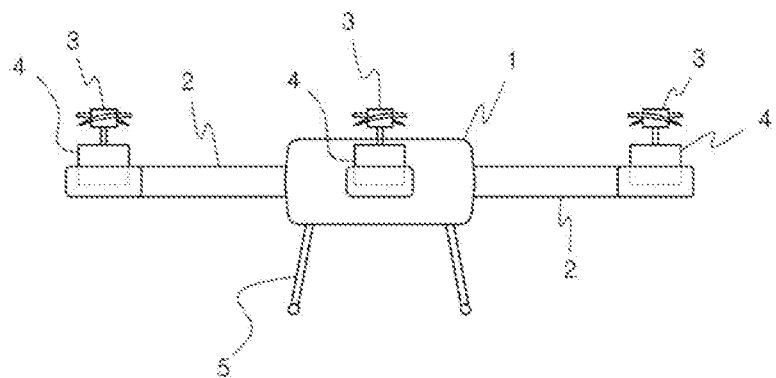
FIG. 1 is a front view illustrating an unmanned aerial vehicle according to an embodiment of the present invention.
Figure 2:
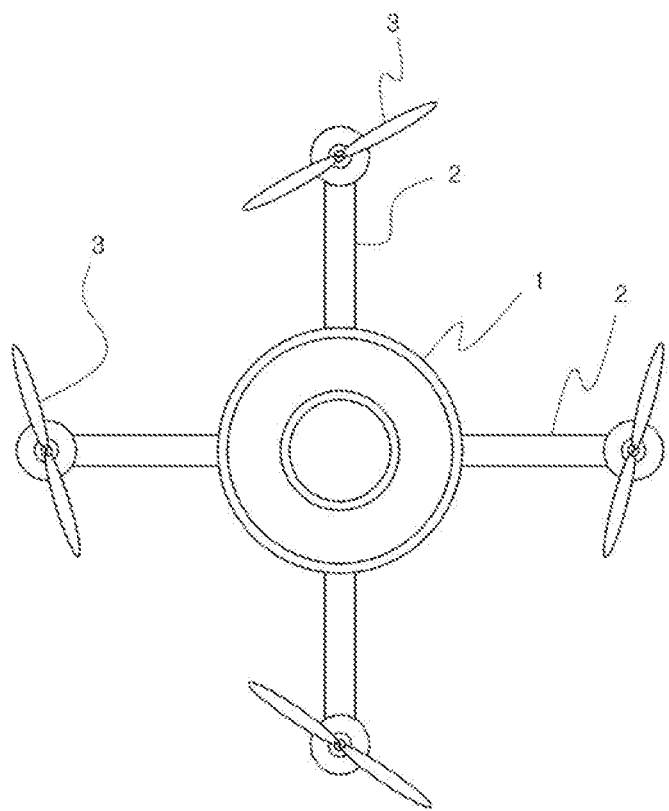
FIG. 2 is a plan view illustrating an unmanned aerial vehicle according to an embodiment of the present invention.

FIG. 1 is a front view illustrating an unmanned aerial vehicle according to an embodiment of the present invention. FIG. 2 is a plan view illustrating an unmanned aerial vehicle according to an embodiment of the present invention.

Referring to FIGS. 1 and 2, an unmanned aerial vehicle includes a body 1, a plurality of arms 2 provided on the periphery of the body 1, and a plurality of propellers 3 respectively provided in the arms 2 and driven by driving motors 4. The unmanned aerial vehicle may be remotely controlled to move in all directions, including left, right, upward, or downward, or to hover using a remote controller (not shown). The unmanned aerial vehicle may further include a landing device 5 formed on the bottom of the body 1. The landing device 5 may extend from the bottom of the body 1 and space the body 1 at a predetermined distance from the ground to protect the body 1 when the unmanned aerial vehicle lands on the floor or ground.

Figure 3:
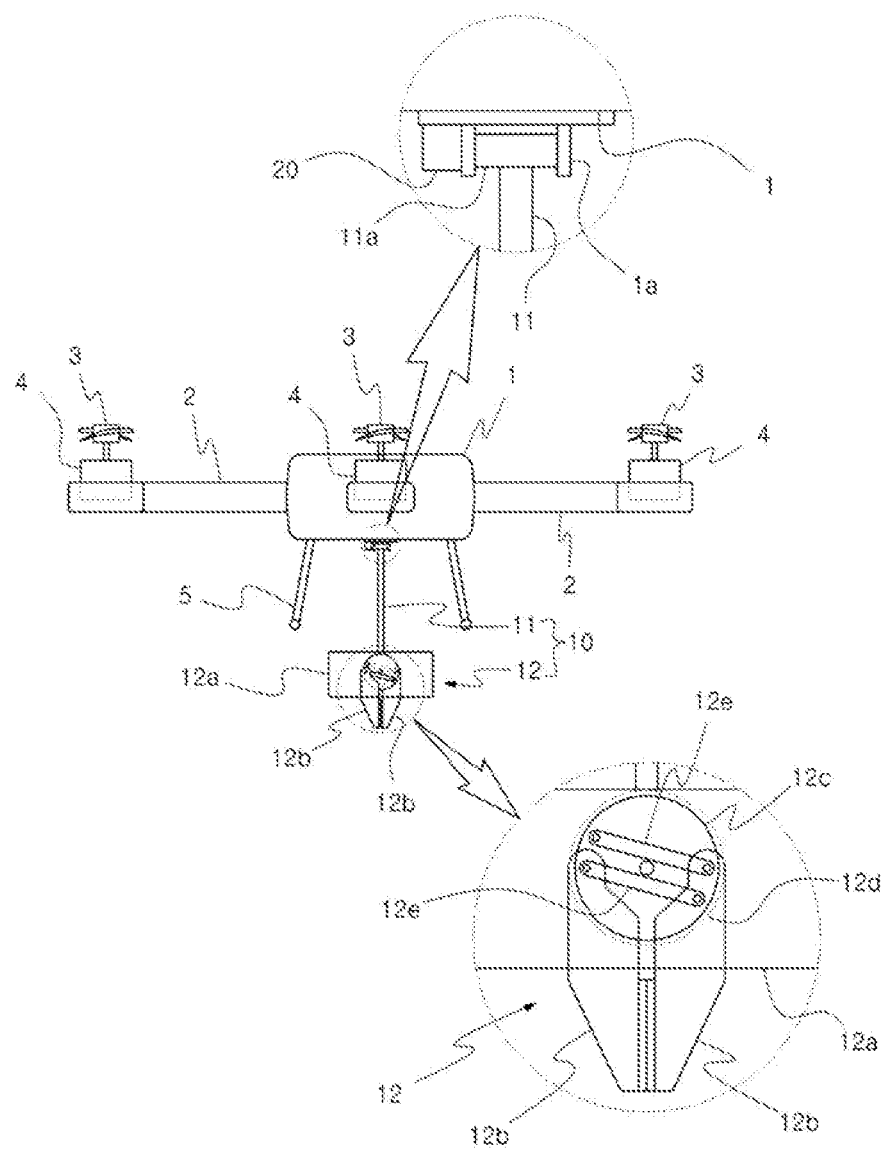
FIG. 3 is a front view illustrating an unmanned aerial vehicle according to an embodiment of the present invention.
Figure 4:
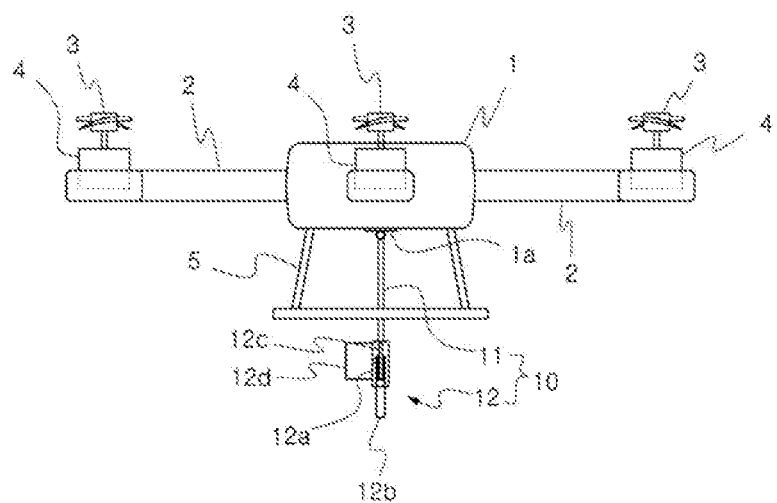
FIG. 4 is a side view illustrating an unmanned aerial vehicle according to an embodiment of the present invention.
Figure 5:
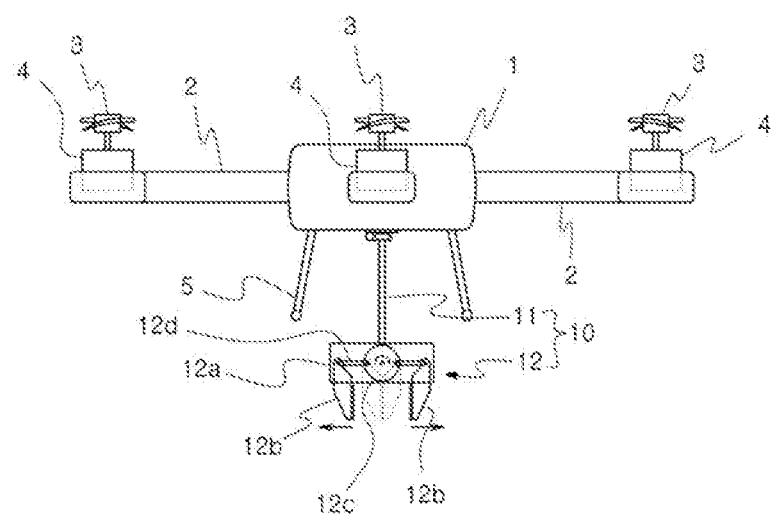
FIG. 5 is a front view illustrating an example of an operation of an unmanned aerial vehicle according to an embodiment of the present invention.
Figure 6:
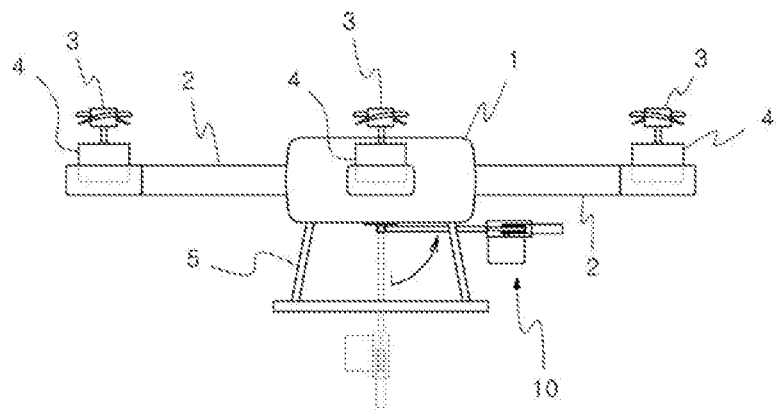
FIG. 6 is a side view illustrating an example of an operation of an unmanned aerial vehicle according to an embodiment of the present invention.

FIG. 3 is a front view illustrating an unmanned aerial vehicle according to an embodiment of the present invention. FIG. 4 is a side view illustrating an unmanned aerial vehicle according to an embodiment of the present invention. FIG. 5 is a front view illustrating an example of an operation of an unmanned aerial vehicle according to an embodiment of the present invention. FIG. 6 is a side view illustrating an example of an operation of an unmanned aerial vehicle according to an embodiment of the present invention.

Referring to FIGS. 3 to 6, an unmanned aerial vehicle includes a body 1, a plurality of arms 2 provided on the periphery of the body 1, and a plurality of propellers 3 respectively provided in the arms 2 and driven by driving motors 4. The unmanned aerial vehicle may be remotely controlled to move in all directions, including left, right, upward, or downward, or to hover using a remote controller (not shown). The unmanned aerial vehicle may further include a landing device 5 formed on the bottom of the body 1. The landing device 5 may extend from the bottom of the body 1 and space the body 1 at a predetermined distance from the ground to protect the body 1 when the unmanned aerial vehicle lands on the floor or ground.

The unmanned aerial vehicle may further include a gripper 10 formed on the bottom of the body 1 to hold or grip an object.

The gripper 10 may include a supporting bar 11 extending form the bottom of the body 1 and a head 12 coupled with an end (e.g., a lower end) of the supporting bar 11 to hold an object.

The supporting bar 11 may be shaped as substantially a bar extending in upper and lower directions thereof or substantially perpendicular with the ground where the unmanned aerial vehicle lands. The supporting bar 11 couples or fastens the head 12 to the body 1.

The head 12 includes a support 12a, a pair of gripping members 12b being slidable in a direction along which the gripping members face or come closer together or away from each other, a rotating member 12c rotatably coupled with the support 12a and rotated clockwise or counterclockwise by a driving motor 12d, and connecting rods 12e connecting the rotating member 12c with the gripping members 12b. A single or multiple connecting rods 12e per each gripping member 12b may be provided.

As shown in FIG. 5, as the driving motor 12d rotates the rotating member 12c, the gripping members 12b may be rendered by the connecting rods 12e to slide to come closer together or away from each other, thereby pressurizing two opposite sides of an object to hold the object.

The head 12 is extended long enough to be positioned under the landing device 5 so that the head 12 holds and fastens the object without interference by the landing device 5.

As such, the gripper 10 may hold an object with a simplified structure and in an effective way.

A rotating bracket 1a is provided on the bottom of the body 1 to allow for rotation of an upper end of the supporting bar 11. An ascending/descending means 20 is connected to the supporting bar 11 to rotatably or pivotally ascend or descend the gripper 10. A hinge shaft 11a is provided on the upper end of the supporting bar 11. The hinge shaft 11a extends laterally (e.g., in a direction substantially perpendicular to the supporting bar 11) to be hinged to the rotating bracket 1a. The ascending/descending means 20 uses a driving motor that is connected with the hinge shaft 11a to rotate the hinge shaft 11a in a forward or backward direction.

As shown in FIGS. 3 to 5, the ascending/descending means 20 may rotate the gripper 10 down to a first position. The first position of the gripper 10 may refer to where the gripper 10 extends to the ground or the gripper 10 is positioned substantially perpendicular with the arms 2 as shown in FIGS. 3 to 5. In the first position, the head 12 of the gripper 10 may be positioned under the landing device 5 to hold an object without interference by the landing device 5. The user of the unmanned aerial vehicle may control the unmanned aerial vehicle using, e.g., a remote controller, with the object gripped by the gripper 10, to transport the object to a desired place.

The ascending/descending means 20 comprises a driving motor that is connected with the hinge shaft 11a to rotate the hinge shaft 11a in a forward or backward direction. The second position of the gripper 10 may refer to where the gripper 10 extends or is positioned substantially parallel with the arms 2 or the ground as shown in FIG. 6. The main body 10 may be left at the second position, e.g., when the unmanned aerial vehicle lands on the ground, to prevent the gripper 10 from interfering with the safe landing of the unmanned aerial vehicle.

As such, the unmanned aerial vehicle may hover over an object while the gripper 10 holds the object, and the unmanned aerial vehicle may then transport or carry the object to the user's desired place.

Accordingly, the unmanned aerial vehicle eliminates the need for the user himself to mount an object in the unmanned aerial vehicle to carry the object and may safely transport the object even when the object is placed in a site which is difficult for the user or worker to reach, e.g., a dangerous or hazardous place.

Figure 7:
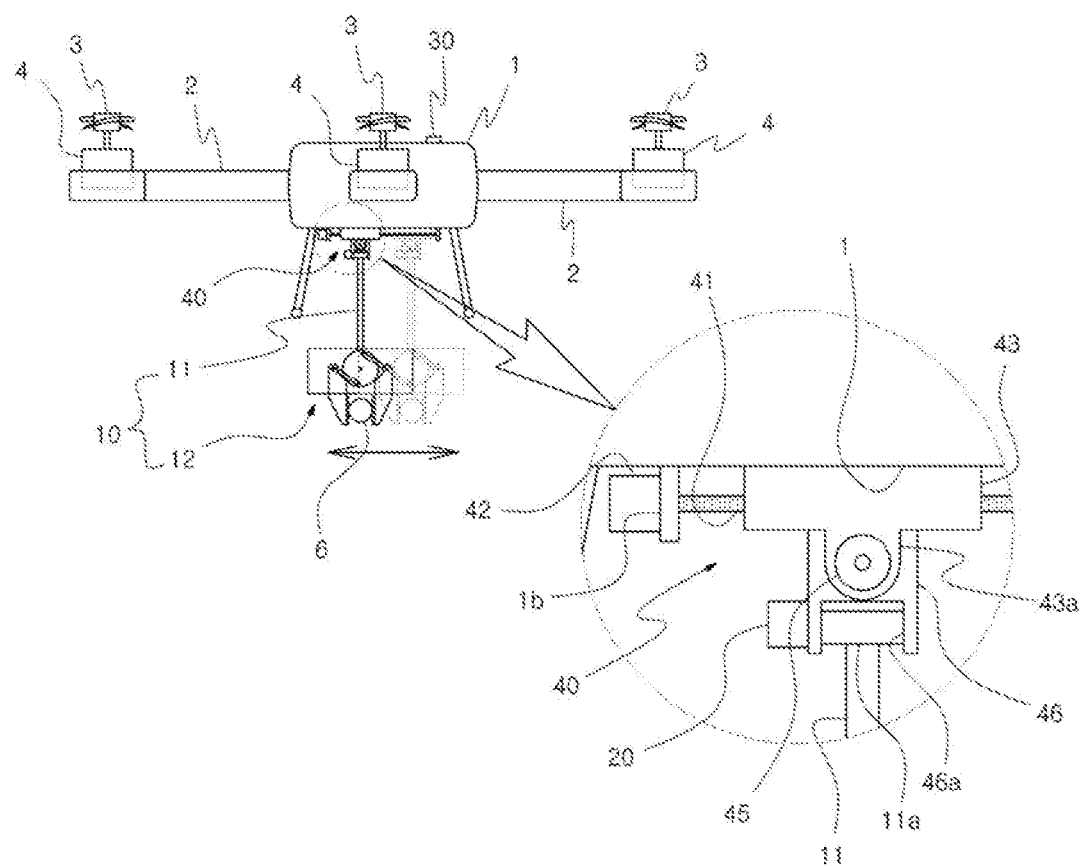
FIG. 7 is a front view illustrating an unmanned aerial vehicle according to an embodiment of the present invention.
Figure 8:
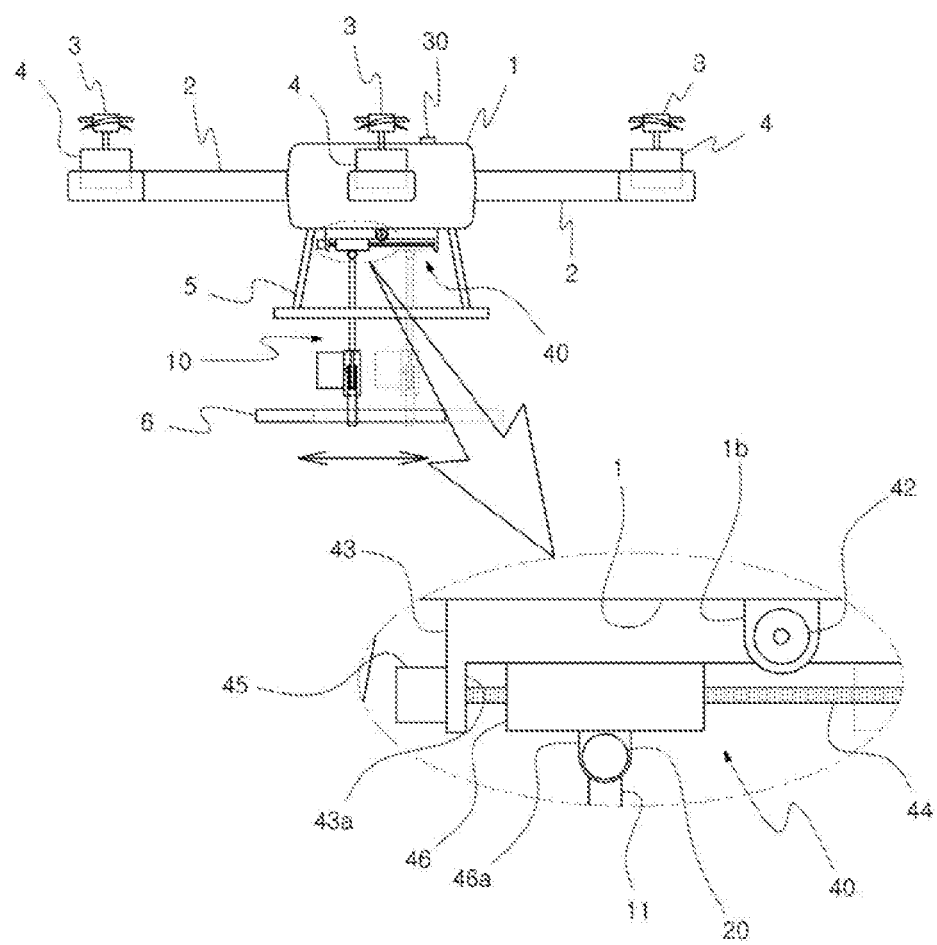
FIG. 8 is a side view illustrating an unmanned aerial vehicle according to an embodiment of the present invention.
Figure 9:
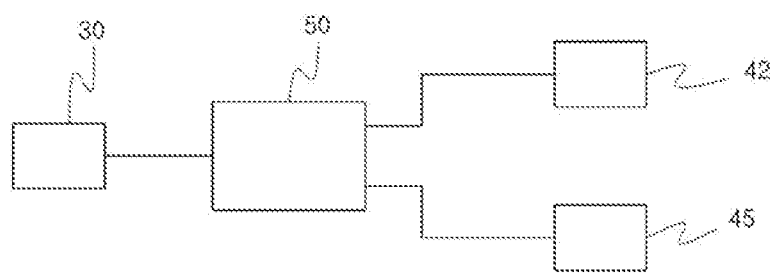
FIG. 9 is a circuit diagram illustrating an unmanned aerial vehicle according to an embodiment of the present invention.

FIG. 7 is a front view illustrating an unmanned aerial vehicle according to an embodiment of the present invention. FIG. 8 is a side view illustrating an unmanned aerial vehicle according to an embodiment of the present invention. FIG. 9 is a circuit diagram illustrating an unmanned aerial vehicle according to an embodiment of the present invention.

Referring to FIGS. 7 to 9, the unmanned aerial vehicle may further include a horizontality sensor 30 provided in the body 1, a position adjustor 40 provided in the body 1 to adjust the position of the gripper 10, and a controller 50 controlling the position adjustor 40 to adjust the position of the gripper 10. The horizontality sensor 30 may be a level to determine or adjust the unmanned aerial vehicle to a horizontal surface. The position adjustor 40 may adjust the position of the gripper 10, e.g., in a front, rear, left, or right direction thereof. The position adjustor 40 may be controlled by the controller 50 to adjust the position of the gripper 10. The controller 50 may receive a signal from the horizontality sensor 30 to control the position adjustor 40.

The horizontality sensor 30 may use an electrical or electronic slope sensor. The horizontality sensor 30 may detect or determine whether the body 1 remains horizontal with respect to, e.g., the ground, when the unmanned aerial vehicle hovers on the ground. When the body 1 is inclined to a side, the horizontality sensor 30 may detect the side to which the body 1 is inclined.

The position adjustor 40 may be provided on the bottom of the body 1. The position adjustor 40 may include a first lead screw 41 extending laterally under the bottom of the 1 and having two opposite ends rotatably coupled with a first bracket 1b provided on the bottom of the body 1, a first driving motor 42 connected with the first lead screw 41 to rotate the first lead screw 41 clockwise or counterclockwise, a first sliding block 43 coupled to the bottom of the body 1 to be slidable laterally, having the first lead screw 41 pass therethrough from a side thereof to the other, the first sliding block being moved laterally as the first lead screw 41 rotates, a second lead screw 44 provided to extend in front and rear directions thereof under the first sliding block 43 and having two opposite ends rotatably coupled to a second bracket 43a provided on the bottom of the first sliding block 43, a second driving motor 45 connected with the second lead screw 44 to rotate the second lead screw 44 clockwise or counterclockwise, and a second sliding block 46 coupled to the bottom of the first sliding block 43 to be slidable in a front or rear direction thereof, having the second lead screw 44 pass therethrough in the front or rear direction thereof, the second sliding block being moved in the front or rear direction as the second lead screw 44 rotates.

The direction along which the first sliding block 43 moves may be substantially perpendicular with the direction along which the second sliding block 46.

The hinge shaft 11a provided at the upper end of the supporting bar 11 of the gripper 10 may be rotatably coupled with a third bracket 46a provided on the bottom of the second sliding block 46 to be rotated in an upper or lower direction thereof by the ascending/descending means 20.

When the first and second driving motors 42 and 45 are driven or actuated to rotate the first and second lead screws 41 and 44 in a forward or reward direction, the first and second sliding blocks 43 and 46 may be moved or positioned in a front, rear, left, or right direction thereof, allowing the gripper 10 to be positioned in the front, rear, left, or right direction thereof.

The controller 50 may receive a signal from the horizontality sensor 30. When the center of gravity of the object 6 gripped by the gripper 10 is inconsistent with the center of gravity of the body 1, the controller 50 may adjust the position of the gripper 10 in a front, rear, left, or right direction thereof so that the center of gravity of the object 6 becomes consistent with the center of gravity of the body 1.

For example, the controller 50 may determine whether the center of gravity of the object 6 gripped by the gripper 10 is consistent with the center of gravity of the body 1, based on a signal received from the horizontality sensor 30, and if is determined that there is inconsistency in the center of gravity between the object 6 and the body 1, the controller 50 may control the position adjustor 40 to move the gripper 10 to a position allowing the object 6 to be consistent in the center of gravity with the body 1.

Such inconsistency in the center of gravity between the object 6 and the body 1 may cause the body 1 to be pushed to the object 6, rendering it difficult for the unmanned aerial vehicle to fly or hover in a stable position.

When such inconsistency in the center of gravity occurs, the controller 50 may determine a side to which the body 1 is inclined based on a signal received from the horizontality sensor 30 and may control the position adjustor 40 to move the gripper 10 and the object 6 to an opposite side of the inclined side, allowing the object 6 and the body 1 to reach an identical center of gravity.

Thus, the unmanned aerial vehicle may fly or hover at a stable position.

While the inventive concept has been shown and described with reference to exemplary embodiments thereof, it will be apparent to those of ordinary skill in the art that various changes in form and detail may be made thereto without departing from the spirit and scope of the inventive concept as defined by the following claims.

What is claimed is:

1. An unmanned aerial vehicle, comprising:
    a body;
    a plurality of arms provided on a periphery of the body;
    a propeller provided on each of the plurality of arms;
    a driving motor provided on each of the plurality of arms to drive each corresponding propeller;
    a gripper provided on a bottom of the body to grip an object, wherein the gripper includes:
    a supporting bar extending downward from the bottom of the body; and
    a head provided at a lower end of the supporting bar to grip the object, wherein the head includes a support, a pair of gripping members being slidable in a direction along which the gripping members come closer together, a rotating member rotatably coupled with the support and rotated clockwise or counterclockwise by an additional driving motor provided on the support, and a pair of connecting rods connecting the rotating member with the gripping members, connecting rod connected with each corresponding gripping member, and wherein the gripping members slide to come closer together or away from each other along the connecting rods when the driving motor of the support rotates the rotating member, thereby pressing against a periphery surface of the object to hold or fasten the object.

2. The unmanned aerial vehicle of claim 1, wherein a landing device is provided on the bottom of the body, wherein the supporting bar is configured to allow the head to be positioned at a lower side of the landing device, wherein an upper end of the supporting bar is rotatably coupled to a rotating bracket mounted to the bottom of the body such that the supporting bar can rotate around the rotating bracket, and wherein an ascending/descending means is connected with the upper end of the supporting bar to ascend or descend the gripper.

3. The unmanned aerial vehicle of claim 1, further comprising:
    a horizontality sensor provided in the body;
    a position adjustor provided in the body to adjust a position of the gripper in a front, rear, left, or right direction of the gripper; and
    a controller receiving a signal from the horizontality sensor to control the position adjustor to adjust the position of the gripper in the front, rear, left, or right direction of the gripper, wherein when a center of gravity of the object gripped by the gripper is inconsistent with a center of gravity of the body, the controller adjusts the position of the gripper in the front, rear, left, or right direction of the gripper using the position adjustor so that the center of gravity of the object is consistent with the center of gravity of the body,
    wherein the position adjustor comprises a first lead screw extending laterally under the bottom of the body and having two opposite ends rotatably coupled with a first bracket provided on the bottom of the body, a first lead screw driving motor connected with the first lead screw to rotate the first lead screw clockwise or counterclockwise, a first sliding block coupled to the bottom of the body to be slidable laterally, having the first lead screw pass therethrough from a side thereof to the other, the first sliding block being moved laterally as the first lead screw rotates, a second lead screw provided to extend in front and rear directions of the body under the first sliding block and having two opposite ends rotatably coupled to a second bracket provided on the bottom of the first sliding block, a second lead screw driving motor connected with the second lead screw to rotate the second lead screw clockwise or counterclockwise, and a second sliding block coupled to the bottom of the first sliding block to be slidable in a front or rear direction thereof, having the second lead screw pass therethrough in the front or rear direction thereof, the second sliding block being moved in the front or rear direction as the second lead screw rotates.

\* \* \* \* \*